United States Patent
Yuan

(10) Patent No.: US 7,867,618 B2
(45) Date of Patent: Jan. 11, 2011

(54) INTERLAYERS COMPRISING MODIFIED FUMED SILICA

(75) Inventor: Ping Yuan, Amherst, MA (US)

(73) Assignee: Solutia Incorporated, St. Louis, MO (US)

( * ) Notice: Subject to any disclaimer, the term of this patent is extended or adjusted under 35 U.S.C. 154(b) by 0 days.

(21) Appl. No.: 12/021,293

(22) Filed: Jan. 28, 2008

(65) Prior Publication Data
US 2008/0124540 A1 May 29, 2008

Related U.S. Application Data

(63) Continuation of application No. 11/423,435, filed on Jun. 10, 2006, now Pat. No. 7,348,062.

(51) Int. Cl.
*B32B 5/16* (2006.01)
*B32B 17/10* (2006.01)
*B32B 37/04* (2006.01)
*C08K 3/36* (2006.01)
*C08L 27/02* (2006.01)
*C08L 31/02* (2006.01)
*C08L 33/04* (2006.01)
*C08L 75/04* (2006.01)

(52) U.S. Cl. ................... 428/437; 156/106; 428/331; 428/425.6; 428/430; 428/436; 428/441; 428/442; 524/492; 524/493

(58) Field of Classification Search .............. 428/425.6, 428/430, 436, 437, 441, 442, 331; 156/106; 524/492, 493
See application file for complete search history.

(56) References Cited

U.S. PATENT DOCUMENTS

| | | | |
|---|---|---|---|
| 2,725,320 A | 11/1955 | Atkeson | |
| 3,983,070 A * | 9/1976 | Penneck | ............. 523/209 |
| 4,030,940 A | 6/1977 | Chuiko | |
| 4,144,376 A | 3/1979 | Beckmann | |
| 4,681,810 A | 7/1987 | Gomez | |
| 4,704,418 A | 11/1987 | Gomez | |
| 4,707,304 A | 11/1987 | Gomez | |
| 4,713,405 A | 12/1987 | Koga | |
| 5,246,764 A | 9/1993 | LaPorte | |
| 5,342,653 A | 8/1994 | Simon | |
| 5,478,412 A | 12/1995 | Simon | |
| 5,547,736 A | 8/1996 | Simon | |
| 5,665,803 A | 9/1997 | Nohr | |
| 6,331,582 B1 | 12/2001 | Chen | |
| 6,750,285 B1 | 6/2004 | Stewart | |
| 2006/0007550 A1 | 1/2006 | Tonar | |
| 2006/0110593 A1 * | 5/2006 | Fukatani et al. | ............. 428/328 |
| 2006/0167139 A1 * | 7/2006 | Nelson et al. | ............. 523/212 |

FOREIGN PATENT DOCUMENTS

| | | |
|---|---|---|
| DE | 197 56 274 | 6/1999 |
| EP | 0 227 633 | 12/1986 |
| EP | 0 928 818 | 7/1999 |
| JP | 07 267626 | 10/1995 |
| WO | WO 99/32283 | 7/1999 |

OTHER PUBLICATIONS www.aerosil.com R972 Retrieved from internet on Jul. 20, 2009.

* cited by examiner

*Primary Examiner*—D. S Nakarani
(74) *Attorney, Agent, or Firm*—Lewis, Rice & Fingersh, L.C.

(57) ABSTRACT

The present invention includes polymer interlayers that are used in multiple layer glazing panels. Interlayers of the present invention comprise a thermoplastic polymer, a plasticizer, and a fumed silica that has been modified to impart hydrophobic character. Interlayers incorporating such components have improved tensile modulus, moisture resistance, creep performance, anticorrosion effect, glass adhesion, and are well suited to a variety of applications, including, but not limited to, acoustic applications.

18 Claims, No Drawings

INTERLAYERS COMPRISING MODIFIED FUMED SILICA

CROSS-REFERENCE TO RELATED APPLICATIONS

This application claims priority to and is a continuation of U.S. application Ser. No. 11/423,435 filed on Jun. 10, 2006, now U.S. Pat. No. 7,348,062 which is hereby incorporated by reference in its entirety.

FIELD OF THE INVENTION

The present invention is in the field of multiple layer glazing panel interlayers and, more specifically, the present invention is in the field of multiple layer glazing panel interlayers comprising modified polymeric compositions.

BACKGROUND

Poly(vinyl butyral) (PVB) is commonly used in the manufacture of polymer sheets that can be used as interlayers in light-transmitting laminates such as safety glass or polymeric laminates. Safety glass often refers to a transparent laminate comprising a plasticized poly(vinyl butyral) sheet disposed between two sheets of glass. Safety glass often is used to provide a transparent barrier in architectural and automotive openings. Its main function is to absorb energy, such as that caused by a blow from an object, without allowing penetration through the opening or the dispersion of shards of glass, thus minimizing damage or injury to the objects or persons within an enclosed area. Safety glass also can be used to provide other beneficial effects, such as to attenuate acoustic noise, reduce UV and/or IR light transmission, and/or enhance the appearance and aesthetic appeal of window openings.

Interlayers that are particularly useful in applications in which the attenuation of noise is desired are often formulated to have a relatively low glass transition temperature. Because of the composition changes that are typically employed to attain a low glass transition temperature, however, interlayers can often have a tensile modulus that is less than desirable, making the interlayer either unsuitable or undesirable for use in some applications.

Among the various techniques that have been employed to overcome this problem is the modification of one or more of the components of the interlayer having a low glass transition temperature.

What are needed in the art are interlayers that are formulated to allow for easy handling of the interlayer while maintaining the sound attenuating qualities in multiple layer glazing applications in which noise suppression is desired and other applications.

SUMMARY OF THE INVENTION

The present invention includes polymer interlayers that are used in multiple layer glazing panels. Interlayers of the present invention comprise a thermoplastic polymer, a plasticizer, and a fumed silica that has been modified to impart hydrophobic character. Interlayers incorporating such components have improved tensile modulus, moisture resistance, creep performance, anticorrosion effect, glass adhesion, and are well suited to a variety of applications, including, but not limited to, acoustic applications.

DETAILED DESCRIPTION

The present invention involves fumed silica agents and their use in interlayers and multiple layer glazing panels comprising those interlayers. As used herein, a "multiple layer glazing interlayer" means an interlayer that can be used in a glazing having more than one layer, for example, two panes of glass with an interlayer therebetween. Interlayers can consist of a single polymer layer or multiple layers combined. Glazing panels can be used, for example, in automotive windshields and architectural applications.

As is disclosed herein, modified fumed silica is incorporated in polymer sheets that are useful as interlayers—or as layers within interlayers—for use in multiple layer glazing panel applications. As will be described in detail below, polymer sheets of the present invention can comprise any suitable thermoplastic polymer, and, in preferred embodiments, polymer sheets comprise poly(vinyl butyral).

In various embodiments of the present invention, modified fumed silica is disposed in a polymer sheet that is incorporated in an interlayer. In these embodiments, the interlayer can comprise only the single polymer sheet or can be a multiple layer interlayer comprising the polymer sheet. Embodiments in which multiple layer interlayers are used include those that are known in the art, and include, for example and without limitation, interlayers having two or more polymer sheets laminated together to form a single interlayer, and interlayers having one or more polymer sheets laminated together with one or more polymer films, which will be described in detail below. In any of these embodiments, the modified fumed silica can be disposed in any one or more of the polymer sheet layers, and the various layers can be the same or different.

Exemplary multiple layer interlayer constructs include the following:

(polymer sheet)$_n$ (polymer sheet/polymer film/polymer sheet)$_p$ where n is 1 to 10 and, in various embodiments, is less than 5, and p is 1 to 5, and, in various embodiments, is less than 3.

Interlayers of the present invention can be incorporated into multiple layer glazing panels, and, in various embodiments, are incorporated between two layers of glass. Applications for such constructs include automobile windshields and architectural glass, among others.

In various embodiments of the present invention, interlayers comprising modified fumed silica are used in bilayers. As used herein, a bilayer is a multiple layer construct having a rigid substrate, such as glass or acrylic, with an interlayer disposed thereon. A typical bilayer construct is: (glass)//(polymer sheet)//(polymer film). Bilayer constructs include, for example and without limitation:

(Glass)//((polymer sheet)$_h$//(polymer film))$_g$ (Glass)//(polymer sheet)$_h$//(polymer film)

where h is 1 to 10, and, in various embodiments is less than 3, and g is 1 to 5, and, in various embodiments, is less than 3.

In further embodiment, interlayers as just described can be added to one side of a multiple layer glazing panel to act as a spall shield, for example and without limitation:

(Multiple Layer Glazing panel)//((polymer sheet)$_h$//(polymer film))$_g$ (Multiple Layer Glazing panel)//(polymer sheet)$_h$//
(polymer film)

where h is 1 to 10, and, in various embodiments is less than 3, and g is 1 to 5, and, in various embodiments, is less than 3.

Conventional, unmodified fumed silica is typically formed using high temperature hydrolysis of chlorosilanes in a hydrogen/oxygen flame. The resulting particles, which are roughly spherical and which comprise almost pure $SiO_2$, sinter together to form branched aggregates, which, after cooling, become mechanically entwined to form agglomerations. Fumed silica produced in this manner will typically have hydroxyl groups present on the surface of the particles, which imparts a hydrophilic character to the fumed silica.

Fumed silica of the present invention is modified from conventional fumed silica to impart a hydrophobic character to the aggregated particles. Modification can comprise using any suitable means or chemical reaction to replace hydroxyl groups on the surface of the fumed suitable with suitable alkyl compounds. In various embodiments of the present invention, silanes such as dimethyldichlorosilane and hexamethyldisilazane, or silicone fluids, are reacted with fumed silica to form a modified fumed silica that has methyl groups substituted for hydroxyl groups at the surface of the aggregated particles. The resulting methylated fumed silica has a hydrophobic character, which, when used in a polymer sheet, improves tensile modulus without unacceptably increasing the haziness or yellowness of the polymer sheet. In other embodiments, other alkyl groups can be substituted for the hydroxyl groups. Examples of alkyl groups include, without limitation, methyl, ethyl, propyl, benzyl, and pentyl.

The total carbon content of the modified fumed silica, on a weight per weight basis, can be at least 0.2, at least 0.5, or at least 0.8 or 0.2-1.0, or 0.5-1.0. Average aggregate length can be, for example, 0.1-1.0 microns, 0.1-0.5 microns, or 0.15 to 0.35 microns. Modified fumed silica is commercially available from, for example, Cabot Corporation (Bellerica Mass.) as CAB-O-SIL TS-610.

The modified fumed silica of the present invention can be added to a polymer melt, as appropriate, to produce a polymer sheet comprising the fumed silica. In various embodiments, the modified fumed silica of the present invention is incorporated into a polymer melt at 0.1 to 10 parts per hundred parts resin ("parts per hundred resin" or phr), 0.1 to 15 phr, or 5 to 10 phr. Other amounts can be used, as appropriate, to achieve the desired result.

In various embodiments of the present invention, modified fumed silica is incorporated at the above-given concentrations and plasticizer is incorporated into the polymer melt at 15-75 or 20 to 60 phr, in any combination with the ranges given for the fumed silica.

In various embodiments, polymer sheets of the present invention comprising the above-described modified fumed silica can have a glass transition temperature of less than 40° C., less than 35° C., or less than 30° C.

In further embodiments of the present invention, the polymer sheets having modified fumed silica have enhanced creep performance at high temperatures due to the network structures built between the silica and poly(vinyl butyral). Moreover, laminates made with polymer sheets of the present invention have improved moisture resistance due to the hydrophobic character of the modified fumed silica. Furthermore, polymer sheets that incorporate modified fumed silica of the have improved adhesion to glass.

In various embodiments, polymer sheets of the present invention comprising the above-described modified fumed silica can have a tensile modulus of at least 8 mega Pascal, 10 mega Pascal, or 12 mega Pascal, and these tensile moduli can be combined with any of the values given above for glass transition temperature to form various embodiments. Polymer sheets of the present invention can also have a haze below 1% and a yellowness value that is unchanged relative to an equivalent sheet that lacks the modified fumed silica.

Polymer Film

As used herein, a "polymer film" means a relatively thin and rigid polymer layer that functions as a performance enhancing layer. Polymer films differ from polymer sheets, as used herein, in that polymer films do not themselves provide the necessary penetration resistance and glass retention properties to a multiple layer glazing structure, but rather provide performance improvements, such as infrared absorption character. Poly(ethylene terephthalate) is most commonly used as a polymer film.

In various embodiments, the polymer film layer has a thickness of 0.013 mm to 0.20 mm, preferably 0.025 mm to 0.1 mm, or 0.04 to 0.06 mm. The polymer film layer can optionally be surface treated or coated to improve one or more properties, such as adhesion or infrared radiation reflection. These functional performance layers include, for example, a multi-layer stack for reflecting infrared solar radiation and transmitting visible light when exposed to sunlight. This multi-layer stack is known in the art (see, for example, WO 88/01230 and U.S. Pat. No. 4,799,745) and can comprise, for example, one or more Angstroms-thick metal layers and one or more (for example two) sequentially deposited, optically cooperating dielectric layers. As is also known, (see, for example, U.S. Pat. Nos. 4,017,661 and 4,786,783), the metal layer(s) may optionally be electrically resistance heated for defrosting or defogging of any associated glass layers.

An additional type of polymer film that can be used with the present invention, which is described in U.S. Pat. No. 6,797,396, comprises a multitude of nonmetallic layers that function to reflect infrared radiation without creating interference that can be caused by metallic layers.

The polymer film layer, in some embodiments, is optically transparent (i.e. objects adjacent one side of the layer can be comfortably seen by the eye of a particular observer looking through the layer from the other side), and usually has a greater, in some embodiments significantly greater, tensile modulus regardless of composition than that of any adjacent polymer sheet. In various embodiments, the polymer film layer comprises a thermoplastic material. Among thermoplastic materials having suitable properties are nylons, polyurethanes, acrylics, polycarbonates, polyolefins such as polypropylene, cellulose acetates and triacetates, vinyl chloride polymers and copolymers, and the like. In various embodiments, the polymer film layer comprises materials such as re-stretched thermoplastic films having the noted properties, which include polyesters, for example poly(ethylene terephthalate) and poly(ethylene terephthalate) glycol (PETG). In various embodiments, poly(ethylene terephthalate) is used, and, in various embodiments, the poly(ethylene terephthalate) has been biaxially stretched to improve strength, and has been heat stabilized to provide low shrinkage characteristics when subjected to elevated temperatures (e.g. less than 2% shrinkage in both directions after 30 minutes at 150° C.).

Various coating and surface treatment techniques for poly(ethylene terephthalate) film that can be used with the present invention are disclosed in published European Application No. 0157030. Polymer films of the present invention can also include a hardcoat and/or and antifog layer, as are known in the art.

Polymer Sheet

The following section describes the various materials, such as poly(vinyl butyral), that can be used to form polymer sheets of the present invention comprising the modified fumed silica described elsewhere herein.

As used herein, a "polymer sheet" means any thermoplastic polymer composition formed by any suitable method into a thin layer that is suitable alone, or in stacks of more than one layer, for use as an interlayer that provides adequate penetration resistance and glass retention properties to laminated glazing panels. Plasticized poly(vinyl butyral) is most commonly used to form polymer sheets.

As used herein, "resin" refers to the polymeric (for example poly(vinyl butyral)) component that is removed from the mixture that results from the acid catalysis and subsequent neutralization of the polymeric precursors. Resin will generally have other components in addition to the polymer, such as acetates, salts, and alcohols. As used herein, "melt" refers to a melted mixture of resin with a plasticizer and, optionally, other additives.

The polymer sheets of the present invention can comprise any suitable polymer, and, in a preferred embodiment, as exemplified above, the polymer sheet comprises poly(vinyl butyral). In any of the embodiments of the present invention given herein that comprise poly(vinyl butyral) as the polymeric component of the polymer sheet, another embodiment is included in which the polymer component consists of or consists essentially of poly(vinyl butyral). In these embodiments, any of the variations in additives, including plasticizers, disclosed herein can be used with the polymer sheet having a polymer consisting of or consisting essentially of poly(vinyl butyral).

In one embodiment, the polymer sheet comprises a polymer based on partially acetalized poly(vinyl alcohol)s. In another embodiment, the polymer sheet comprises a polymer selected from the group consisting of poly(vinyl butyral), poly(vinyl chloride), poly(ethylene-co-vinyl acetate), poly(ethylene-co-ethyl acrylate), ionomers of partially neutralized ethylene/(meth)acrylic acid copolymer (such as Surlyn® from DuPont), polyethylene, polyethylene copolymers, polyurethane, or poly(cyclohexanedimethylene terephthalate-co-ethylene terephthalate) copolyester. In various embodiments, the polymer sheet comprises poly(vinyl butyral), polyurethane, poly(vinyl chloride), poly(ethylene vinyl acetate), or combinations thereof. In further embodiments the polymer sheet comprises poly(vinyl butyral) and one or more other polymers. Other polymers having a suitable glass transition temperature can also be used. In any of the sections herein in which preferred ranges, values, and/or methods are given specifically for poly(vinyl butyral) (for example, and without limitation, for plasticizers, component percentages, thicknesses, and characteristic-enhancing additives), those ranges also apply, where applicable, to the other polymers and polymer blends disclosed herein as useful components in polymer sheets.

For embodiments comprising poly(vinyl butyral), the poly(vinyl butyral) can be produced by known acetalization processes, as are known to those skilled in the art (see, for example, U.S. Pat. Nos. 2,282,057 and 2,282,026). In one embodiment, the solvent method described in Vinyl Acetal Polymers, in Encyclopedia of Polymer Science & Technology, 3$^{rd}$ edition, Volume 8, pages 381-399, by B. E. Wade (2003) can be used. In another embodiment, the aqueous method described therein can be used. Poly(vinyl butyral) is commercially available in various forms from, for example, Solutia Inc., St. Louis, Mo. as Butvar™ resin.

In various embodiments, the polymer sheet resin comprising poly(vinyl butyral) comprises 10 to 35 weight percent (wt. %) hydroxyl groups calculated as poly(vinyl alcohol), 13 to 30 wt. % hydroxyl groups calculated as poly(vinyl alcohol), or 15 to 22 wt. % hydroxyl groups calculated as poly(vinyl alcohol). The polymer sheet resin can also comprise less than 15 wt. % residual ester groups, 13 wt. %, 11 wt. %, 9 wt. %, 7 wt. %, 5 wt. %, or less than 3 wt. % residual ester groups calculated as polyvinyl acetate, with the balance being an acetal, preferably butyraldehyde acetal, but optionally including other acetal groups in a minor amount, for example, a 2-ethyl hexanal group (see, for example, U.S. Pat. No. 5,137,954).

In various embodiments, the polymer sheet comprises poly(vinyl butyral) having a molecular weight at least 30,000, 40,000, 50,000, 55,000, 60,000, 65,000, 70,000, 120,000, 250,000, or at least 350,000 grams per mole (g/mole or Daltons). Small quantities of a dialdehyde or trialdehyde can also be added during the acetalization step to increase molecular weight to at least 350,000 g/mole (see, for example, U.S. Pat. Nos. 4,902,464; 4,874,814; 4,814,529; and, 4,654,179). As used herein, the term "molecular weight" means the weight average molecular weight.

Various adhesion control agents can be used in polymer sheets of the present invention, including sodium acetate, potassium acetate, and magnesium salts. Magnesium salts that can be used with these embodiments of the present invention include, but are not limited to, those disclosed in U.S. Pat. No. 5,728,472, such as magnesium salicylate, magnesium nicotinate, magnesium di-(2-aminobenzoate), magnesium di-(3-hydroxy-2-napthoate), and magnesium bis(2-ethyl butyrate)(chemical abstracts number 79992-76-0). In various embodiments of the present invention the magnesium salt is magnesium bis(2-ethyl butyrate).

Other additives may be incorporated into the polymer sheet to enhance its performance in a final product. Such additives include, but are not limited to, dyes, pigments, stabilizers (e.g., ultraviolet stabilizers), antioxidants, antiblock agents, additional IR absorbers, flame retardants, combinations of the foregoing additives, and the like, as are known in the art.

In various embodiments of polymer sheets of the present invention, the polymer sheets can comprise 20 to 60, 25 to 60, 20 to 80, 10 to 70, or 10 to 100 parts plasticizer phr. Of course other quantities can be used as is appropriate for the particular application. In some embodiments, the plasticizer has a hydrocarbon segment of fewer than 20, fewer than 15, fewer than 12, or fewer than 10 carbon atoms. The amount of plasticizer can be adjusted to affect the glass transition temperature ($T_g$) of the poly(vinyl butyral) sheet. In general, higher amounts of plasticizer are added to decrease the $T_g$.

Any suitable plasticizers can be added to the polymer resins of the present invention in order to form the polymer sheets. Plasticizers used in the polymer sheets of the present invention can include esters of a polybasic acid or a polyhydric alcohol, among others. Suitable plasticizers include, for example, triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, mixtures of phosphates and adipates such as disclosed in U.S. Pat. No. 3,841,890, adipates such as disclosed in U.S. Pat. No. 4,144,217, and mixtures and combinations of the foregoing. Other plasticizers that can be used are mixed adipates made from $C_4$ to $C_9$ alkyl alcohols and cyclo $C_4$ to $C_{10}$ alcohols, as disclosed in U.S. Pat. No. 5,013, 779, and $C_6$ to $C_8$ adipate esters, such as hexyl adipate. In various embodiments, the plasticizer used is dihexyl adipate and/or triethylene glycol di-2 ethylhexanoate.

The poly(vinyl butyral) polymer, plasticizer, and any additives can be thermally processed and configured into sheet form according to methods known to those of ordinary skill in the art. One exemplary method of forming a poly(vinyl butyral) sheet comprises extruding molten poly(vinyl butyral) comprising resin, plasticizer, and additives by forcing the melt through a die (for example, a die having an opening that is substantially greater in one dimension than in a perpendicular dimension). Another exemplary method of forming a poly(vinyl butyral) sheet comprises casting a melt from a die onto a roller, solidifying the resin, and subsequently removing the solidified resin as a sheet. In various embodiments, the polymer sheets can have thicknesses of, for example, 0.1 to 2.5 millimeters, 0.2 to 2.0 millimeters, 0.25 to 1.75 millimeters, and 0.3 to 1.5 millimeters.

For each embodiment described above comprising a glass layer, another embodiment exists, where suitable, wherein a non-glass glazing type material is used in place of the glass. Examples of such glazing layers include rigid plastics having a high glass transition temperature, for example above 60° C. or 70° C., for example polycarbonates and polyalkyl methacrylates, and specifically those having from 1 to 3 carbon atoms in the alkyl moiety.

Also included in the present invention are stacks or rolls of any of the polymer sheets and interlayers of the present invention disclosed herein in any combination.

The present invention also includes windshields, windows, and other finished glazing products comprising any of the interlayers of the present invention.

The present invention includes methods of manufacturing interlayers and glazing panels comprising forming an interlayer or glazing panel of the present invention using any of the polymer sheets of the present invention described herein.

Various polymer sheet and/or laminated glass characteristics and measuring techniques will now be described for use with the present invention.

The clarity of laminated glass comprising a polymer sheet, can be determined by measuring the haze value, which is a quantification of the scattered light by a sample in contrast to the incident light. The percent haze can be measured according to the following technique. An apparatus for measuring the amount of haze, a Hazemeter, Model D25, which is available from Hunter Associates (Reston, Va.), can be used in accordance with ASTM D1003-61 (Re-approved 1977)-Procedure A, using Illuminant C, at an observer angle of 2 degrees. In various embodiments of the present invention, percent haze is less than 5%, less than 3%, and less than 1%.

Pummel adhesion can be measured according to the following technique, and where "pummel" is referred to herein to quantify adhesion of a polymer sheet to glass, the following technique is used to determine pummel. Two-ply glass laminate samples are prepared with standard autoclave lamination conditions. The laminates are cooled to about −17° C. (0° F.) and manually pummeled with a hammer to break the glass. All broken glass that is not adhered to the poly(vinyl butyral) sheet is then removed, and the amount of glass left adhered to the poly(vinyl butyral) sheet is visually compared with a set of standards. The standards correspond to a scale in which varying degrees of glass remain adhered to the poly(vinyl butyral) sheet. In particular, at a pummel standard of zero, no glass is left adhered to the poly(vinyl butyral) sheet. At a pummel standard of 10, 100% of the glass remains adhered to the poly(vinyl butyral) sheet. For laminated glass panels of the present invention, various embodiments have a pummel of at least 3, at least 5, at least 8, at least 9, or 10. Other embodiments have a pummel between 8 and 10, inclusive.

The "yellowness index" of a polymer sheet can be measured according to the following: transparent molded disks of polymer sheet 1 cm thick, having smooth polymeric surfaces which are essentially plane and parallel, are formed. The index is measured according to ASTM method D 1925, "Standard Test Method for Yellowness Index of Plastics" from spectrophotometric light transmittance in the visible spectrum. Values are corrected to 1 cm thickness using measured specimen thickness. In various embodiments of the present invention, a polymer sheet can have a yellowness index of 12 or less, 10 or less, or 8 or less.

The visible transmittance can be quantified using a UV-Vis-NIR spectrophotometer such as the Lambda 900 made by Perkin Elmer Corporation by methods described in international standard ISO 10526-1999.

Edge whitening of a glass laminate is measured by subjecting a 15.24 centimeter square section of laminate to a hot and humid environment of 50° C. and 95% relative humidity. Test duration is 4 weeks or more. The whitening band is measured periodically (2 weeks and 4 weeks) as the distance from the edge of the laminate that white color is developed and extended with the exposure time.

Slippage is measured by mounting a 15.24 centimeter square section of laminate in a vertical position and supported by only one of the glass layers and subjecting the laminate to temperatures of 100° C. for 100 hours or more. Slippage at any time point is the distance that the unsupported glass layer has moved downward relative to its starting position, and that is usually zero if two pieces of glass are perfectly aligned when the samples are made.

Tensile strength, elongation, and secant modulus are measured using an MTS Sintech 1/GT universal testing instrument, following the method of ASTM D412. All the samples are conditioned at 21° C. and 51% relative humidity for 24 hours prior to measurement.

EXAMPLES

Example 1

100 parts poly(vinyl butyral) resin with a vinyl alcohol content of 10-21 weight percent and a vinyl acetate residue of 0.5-4 weight percent are mixed with 30-75 parts of triethylene glycol di-(2-ethylhexanoate) as plasticizer. 0.25 parts by weight of the Tinuvin 326 (2-tert-butyl-6-(5-chloro-benzotriazol-2-yl)-4-methyl-phenol—available from Ciba Specialty Chemicals) are added, and the resulting mixture is used to form a polymer sheet that is used as a control. The mixture is extruded to form a sheet at a temperature of 180° C. from a Lab extruder.

The same components as given in the above paragraph are again combined and three mixtures are separately formed by adding 1.2, 1.8, or 2.0 weight percent of a modified fumed silica (CAB-O-SIL TS-610—available from Cabot Corporation (Bellerica Mass.)). The three mixtures are extruded to form three test sheets at a temperature of 180° C. from a Lab extruder.

The control polymer sheet and one of the test polymer sheets are tested for mechanical tensile properties. The testing conditions followed ASTM D412 method CTH (21° C./50% relative humidity).

The polymer sheet comprising modified fumed silica shows an increase in tensile stress of 10-30% compared to a control sample lacking the modified fumed silica.

| Sample | Weight Percent Modified Fumed Silica | Tensile stress (Mega Pascal) | Percent Elongation | Secant Modulus (Mega Pascal) |
| --- | --- | --- | --- | --- |
| 1 | 0 | 13.2 | 310 | 0.90 |
| 2 | 1.80 | 17.1 | 298 | 1.21 |

Example 2

The control polymer sheet and one of the test polymer sheets are each laminated between two panes of glass and tested at high temperature and humidity. The glass laminates are exposed to an environment of 50° C. and 95% relative humidity for 4 weeks. The edge whitening band of the laminate, which is caused by moisture penetration, is greatly reduced in the laminated glass incorporated an interlayer comprising modified fumed silica.

| Sample | Weight Percent Modified Fumed Silica | Edge Whitening Band in millimeters (2 weeks exposure) | Edge Whitening Band in millimeters (4 weeks exposure) |
| --- | --- | --- | --- |
| 1 | 0 | 3.5 | 6.0 |
| 2 | 1.20 | 1.0 | 3.0 |

Example 3

The control polymer sheet and one of the test polymer sheets are tested for percent visible light transmittance, haze, and yellowness. Laminate haze below 1% is considered high optical clarity.

| Sample | Weight Percent Modified Fumed Silica | Percent Transmittance | Laminate Percent Haze | Laminate Yellowness |
| --- | --- | --- | --- | --- |
| 1 | 0 | 88.73 | 0.5 | 0.45 |
| 2 | 2.0 | 88.69 | 0.8 | 0.46 |

Example 4

Pummel tests are performed on the control polymer sheet and one of the test polymer sheets. Results show excellent glass adhesion for the polymer sheet comprising modified fumed silica.

| Sample | Weight Percent Modified Fumed Silica | Pummel Adhesion Reading |
| --- | --- | --- |
| 1 | 0 | 3.0 |
| 2 | 2.0 | 8.0 |

Example 5

Slippage tests are performed on two laminates. Results show excellent slippage resistance in the polymer sheet comprising modified fumed silica.

| Sample | Weight Percent Modified Fumed Silica | 24 hours slippage (mm) | 140 hours Slippage (mm) | 220 hours Slippage (mm) |
| --- | --- | --- | --- | --- |
| 1 | 0 | 4.5 | 16 | 21 |
| 2 | 2.0 | 2.8 | 11 | 15 |

By virtue of the present invention, it is now possible to provide interlayers, such as poly(vinyl butyral) sheet, with modified fumed silica having improved physical characteristics without an unacceptable reduction in optical quality.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, and that the invention will include all embodiments falling within the scope of the appended claims.

It will further be understood that any of the ranges, values, or characteristics given for any single component of the present invention can be used interchangeably with any ranges, values, or characteristics given for any of the other components of the invention, where compatible, to form an embodiment having defined values for each of the components, as given herein throughout. For example, a polymer sheet can be formed comprising modified fumed silica in any of the ranges given in addition to comprising plasticizer in any of the ranges given, where appropriate, to form many permutations that are within the scope of the present invention, but that would be cumbersome to list.

Any figure reference numbers given within the abstract or any claims are for illustrative purposes only and should not be construed to limit the claimed invention to any one particular embodiment shown in any figure.

Figures are not drawn to scale unless otherwise indicated.

Each reference, including journal articles, patents, applications, and books, referred to herein is hereby incorporated by reference in its entirety.

I claim:
1. An interlayer, comprising:
   a polymer sheet comprising poly(vinyl butyral) and 0.1 to 10 phr by weight fumed silica, wherein said fumed silica is alkylated, said polymer sheet has a glass transition temperature of less than 40° C., and wherein said interlayer is adapted for use as layer in a multiple layer glazing and does not comprise additional polymer sheets.
2. The interlayer of claim 1, wherein said fumed silica has a carbon content of at least 0.5 weight percent.
3. The interlayer of claim 1, wherein said fumed silica is methylated.
4. The interlayer of claim 1, wherein said fumed silica has an average aggregate length of 0.15 to 0.35 microns.
5. The interlayer of claim 1, wherein said fumed silica has an average aggregate length of 0.2 to 0.3 microns.
6. The interlayer of claim 1, wherein said polymer sheet has 10 to 70 parts per hundred resin of plasticizer and 0.05 to 15 parts per hundred resin of said fumed silica.

7. The interlayer of claim 1, wherein said polymer sheet has 20 to 60 parts per hundred resin of plasticizer and 0.1 to 10 parts per hundred resin of said fumed silica.

8. The interlayer of claim 1, wherein said polymer sheet has 1.2 to 2.0 weight percent of said fumed silica.

9. The interlayer of claim 1, wherein said polymer sheet has a glass transition temperature of less than 35° C.

10. The interlayer of claim 1, wherein said polymer sheet has a glass transition temperature of less than 30° C.

11. A multiple layer glass panel comprising an interlayer, wherein said interlayer comprises:
   a polymer sheet comprising poly(vinyl butyral) and 0.1 to 10 phr by weight fumed silica, wherein said fumed silica is alkylated, said polymer sheet has a glass transition temperature of less than 40° C., and wherein said interlayer does not comprise additional polymer sheets.

12. The panel of claim 11, wherein said fumed silica has a carbon content of at least 0.5 weight percent.

13. The panel of claim 11, wherein said fumed silica is methylated.

14. The panel of claim 11, wherein said fumed silica has an average aggregate length of 0.15 to 0.35 microns.

15. The panel of claim 11, wherein said fumed silica has an average aggregate length of 0.2 to 0.3 microns.

16. The panel of claim 11, wherein said polymer sheet has 10 to 70 parts per hundred resin of plasticizer and 0.05 to 15 parts per hundred resin of said fumed silica.

17. The panel of claim 11, wherein said polymer sheet has 20 to 60 parts per hundred resin of plasticizer and 0.1 to 10 parts per hundred resin of said fumed silica.

18. A method of forming a multiple layer glazing, comprising:
   providing a polymer sheet comprising poly(vinyl butyral) and 0.1 to 10 phr by weight fumed silica, wherein said fumed silica is alkylated, said polymer sheet has a glass transition temperature of less than 40° C.; and,
   laminating said polymer sheet between two panes of glass to form said glazing.

* * * * *